US012619559B2

(12) United States Patent
Ji

(10) Patent No.: US 12,619,559 B2
(45) Date of Patent: May 5, 2026

(54) SMART STORAGE DEVICES

(71) Applicant: SAMSUNG ELECTRONICS CO., LTD., Suwon-si (KR)

(72) Inventor: Soo-Young Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/761,657

(22) Filed: Jul. 2, 2024

(65) Prior Publication Data

US 2025/0231891 A1     Jul. 17, 2025

(30) Foreign Application Priority Data

Jan. 11, 2024    (KR) ........................ 10-2024-0004622

(51) Int. Cl.
*G06F 13/16*      (2006.01)
*G06F 12/0877*    (2016.01)

(52) U.S. Cl.
CPC ...... *G06F 13/1668* (2013.01); *G06F 12/0877* (2013.01); *G06F 2212/603* (2013.01); *G06F 2213/0026* (2013.01)

(58) Field of Classification Search
CPC ............. G06F 13/1668; G06F 12/0877; G06F 2212/603; G06F 2213/0026; G06F 3/061; G06F 3/0658; G06F 3/0679; G06N 3/063; G06N 3/08; G06N 3/045
USPC ........................................................ 711/154
See application file for complete search history.

(56) References Cited

U.S. PATENT DOCUMENTS

| | | | |
|---|---|---|---|
| 7,047,374 B2 | 5/2006 | Sah et al. | |
| 11,645,582 B2 | 5/2023 | Rajamoni et al. | |
| 11,726,914 B2 | 8/2023 | Walker et al. | |
| 2020/0185027 A1 | 6/2020 | Rom et al. | |
| 2021/0127090 A1 | 4/2021 | Kale et al. | |
| 2021/0150321 A1* | 5/2021 | Jang ........................ | G06N 3/08 |
| 2021/0232893 A1 | 7/2021 | Bayat et al. | |
| 2021/0397930 A1 | 12/2021 | Kulkarni et al. | |
| 2022/0100669 A1* | 3/2022 | Choe ....................... | G06F 13/28 |
| 2022/0113915 A1 | 4/2022 | Ki et al. | |
| 2022/0138983 A1* | 5/2022 | Godo ...................... | H01J 37/22 |
| | | | 382/145 |
| 2022/0197506 A1 | 6/2022 | Blagodurov et al. | |
| 2022/0398439 A1 | 12/2022 | Zhang | |

(Continued)

OTHER PUBLICATIONS

Extended European Search Report in European Appln. No. 24190257.6, mailed on Jan. 16, 2025, 14 pages.

*Primary Examiner* — Jared I Rutz
*Assistant Examiner* — Wei Ma
(74) *Attorney, Agent, or Firm* — Fish & Richardson P.C.

(57) ABSTRACT

There is provided a smart storage device. The smart storage device comprises an accelerator which is connected to a host device through a smart interface, and includes a first model distributed from the host device, and a non-volatile memory which includes learning data used for learning the first model, wherein the accelerator learns the first model by using the learning data on the basis of a first weight and a first bias that are set in advance, provides the host device with a first output value which is output by inputting the learning data into the first model, and learns the first model by using the learning data, on the basis of a second weight and a second bias calculated from the host device with reference to the first output value.

20 Claims, 10 Drawing Sheets

<u>10</u>

(56) References Cited

U.S. PATENT DOCUMENTS

| 2023/0109379 | A1* | 4/2023 | Kreis | ........................ G06T 5/70 |
| | | | | 382/157 |
| 2023/0109990 | A1 | 4/2023 | Pappu et al. | |
| 2023/0251792 | A1 | 8/2023 | Navon et al. | |
| 2023/0251935 | A1 | 8/2023 | Navon et al. | |

* cited by examiner

Host(110)          Smart Storage Device #1(130a)    Smart Storage Device #2(130b)

SMART STORAGE DEVICES

CROSS-REFERENCE TO RELATED APPLICATION

This application claims the benefit of the filing date of Korean Patent Application No. 10-2024-0004622, filed on Jan. 11, 2024, in the Korean Intellectual Property Office, the disclosure of which is incorporated herein by reference in its entirety.

BACKGROUND

With advances in technologies such as artificial intelligence (AI), big data, and edge computing, there are needs for devices intended to process larger amounts of data faster. For example, high-bandwidth applications that perform complex arithmetic operations may utilize faster data processing and more efficient memory access. However, connections between host devices and semiconductor devices including a memory may have relatively low bandwidth and long latency, and/or may exhibit problems in memory sharing and/or coherency.

Additionally, as generative AI models become larger, significant resources and time are required for learning the artificial intelligence models. When learning the artificial intelligence model, a considerable amount of learning data is repeatedly moved between the storage device and the host device, resulting in a problem of an increase in input/output traffic.

SUMMARY

Some aspects of the present disclosure provide methods for preventing repeated movement of data between a host device and a smart storage device, by learning an artificial intelligence model in the smart storage device through a cache coherency between the host device and the smart storage device.

According to some implementations of the present disclosure, there is provided a smart storage device. The smart storage device comprises an accelerator which is connected to a host device through a smart interface, and includes a first model distributed from the host device, and a non-volatile memory which includes learning data used for learning the first model, wherein the accelerator learns the first model by using the learning data on the basis of a first weight and a first bias that are set in advance, provides the host device with a first output value which is output by inputting the learning data into the first model, and learns the first model by using the learning data, on the basis of a second weight and a second bias calculated from the host device with reference to the first output value.

According to some implementations of the present disclosure, there is provided a computing system. The computing system comprises a smart interface connected to a host device, and a first smart storage device including a first accelerator and a first non-volatile memory, and a second smart storage device including a second accelerator and a second non-volatile memory, wherein the first accelerator and the second accelerator are each connected to the smart interface, and include a first model distributed from the host device, the first non-volatile memory and the second non-volatile memory each include first learning data and second learning data used for learning the first model, wherein the first accelerator and the second accelerator respectively learn the first model by using the first learning data and the second learning data, on the basis of a first weight and a first bias that are set in advance, respectively provide the host device with a first output value which is output by inputting the first learning data into the first model, and a second output value which is output by inputting the second learning data into the first model, and respectively learn the first model by using the first learning data and the second learning data, on the basis of a second weight and a second bias newly calculated from the host device with reference to the first output value and the second output value.

According to some implementations of the present disclosure, there is provided a method for operating a computing system which includes a host device, a smart interface, and a first smart storage device and a second smart storage device connected to the host device through the smart interface. The method comprises distributing a first model to the first smart storage device and the second smart storage device, in the host device, initializing a first weight and a first bias, in the host device, learning the first model by using first learning data on the basis of the first weight and the first bias, in the first smart storage device, learning the first model by using the second learning data on the basis of the first weight and the first bias, in the second smart storage device, providing the host device with a first output value which is output by inputting the first learning data into the first model, in the first smart storage device, providing the host device with a second output value which is output by inputting the second learning data into the first model, in the second smart storage device, newly calculating a second weight and a second bias with reference to the first output value and the second output value, in the host device, learning the first model by using the first learning data on the basis of the second weight and the second bias, in the first smart storage device, and learning the first model by using the second learning data on the basis of the second weight and the second bias, in the second smart storage device.

BRIEF DESCRIPTION OF THE DRAWINGS

The above and other aspects and features of the present disclosure will become more apparent by describing in detail examples thereof with reference to the attached drawings, in which.

DETAILED DESCRIPTION

Figure 1:
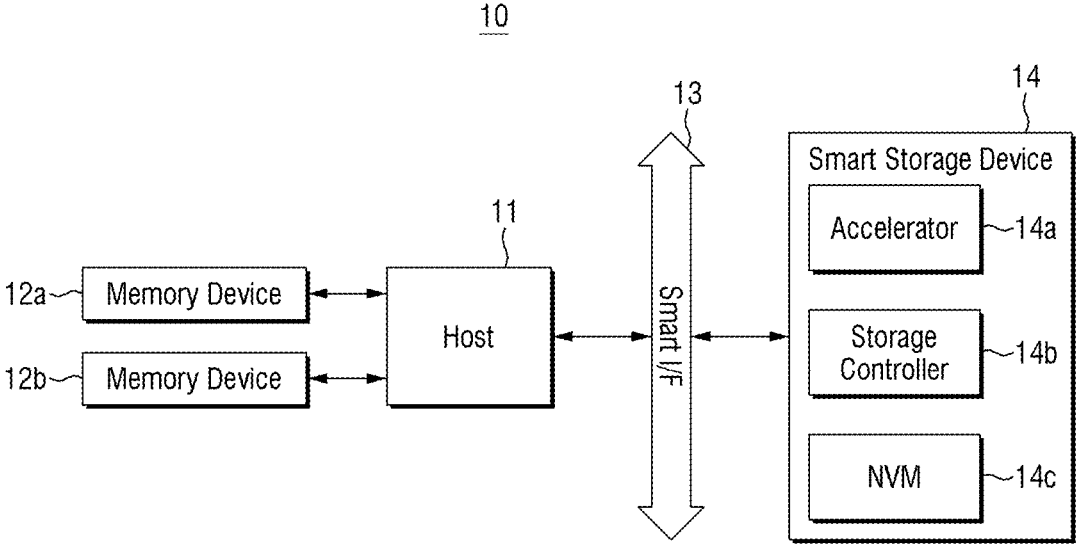
FIG. 1 is a block diagram showing a computing system including a smart storage device according to some implementations of the present disclosure.

Hereinafter, various examples according to the present disclosure will be described with reference to the attached drawings. The present disclosure may, however, be embodied in many different forms and should not be construed as being limited to the examples set forth below.

It should be noted that the same reference numerals in different drawings correspond to the same element In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

FIG. 1 is a block diagram showing a computing system 10 that includes a smart storage device according to some implementations of the present disclosure. Referring to FIG. 1, the computing system 10 includes a host device 11, a plurality of memory devices 12a and 12b, a smart interface 13, and a smart storage device 14.

The host device 11 may control the general operation of the computing system 10. For example, the host device 11 may correspond to a CPU (Central Processing Unit), a GPU (Graphic Processing Unit), an NPU (Neural Processing Unit), a field-programmable gate array (FPGA) processor, a microprocessor, an application processor (AP), and/or the like. According to some implementations, the host device 11 may be implemented as a system on a chip (SoC).

The host device 11 may be, for example, a mobile system such as a mobile phone, a smartphone (smart phone), a tablet personal computer (tablet PC), a wearable device, a healthcare device, an IoT (internet of things) device, and/or an automotive device. In some implementations, the host device 11 is a personal computer, a laptop computer, a server, a media player, or a navigation device.

Further, the host device 11 may include a communication device to send and receive signals to and from devices external to the host device 11 in accordance with various communication protocols. The communication device is a device for implementing a wired or wireless connection, and may be implemented by including, for example, an antenna, a transceiver, and/or a modem. The host device 11 is capable of performing, for example, Ethernet network or wireless communication through a communication device.

The plurality of memory devices 12a and 12b may be used as operating memory and/or system memory of the host device 11. The host device 11 is connected to the smart storage device 14 through the smart interface 13, and may control the overall operation of the smart storage device 14.

For example, the smart interface 13 may be a CXL (Compute eXpress Link) interface. The CXL is an open type industry standard for communication based on PCIe (Peripheral Component Interconnect Express) 5.0, which may provide fixed and relatively short packet sizes, may support a cache coherency, and may be suitable for generating connections to the memory. For example, the CXL interface may provide a low-latency and high-bandwidth link that supports coherency, memory access, and dynamic protocol muxing of input/output protocol (IO protocol) to enable a variety of connections between accelerators, memory devices, and/or different electronic devices.

The smart interface 13 implemented as a CXL interface may include lower protocols CXL.io, CXL.cache, and CXL.mem. The CXL.io protocol is a PCIe transaction layer, and may be used when performing a device search, an interrupt management, an access provision by a register, an initialization process, signal error handling, and/or the like in the system. The CXL.cache protocol defines interactions between a host and a device, e.g., allowing the device to efficiently cache host memory. The CXL.cache protocol may be used when the accelerator 14a accesses the memory 12 of the host device. The CXL.mem protocol provides a host processor with access to device-attached memory using load and store commands. The CXL.mem protocol may be used when the host device 11 accesses a dedicated memory of the accelerator 14a or a memory device (e.g., non-volatile memory (NVM) 14c) included in the smart storage device 14.

The smart storage device 14 may be a semiconductor device that stores data and is capable of performing an arithmetic operation such as processing, e.g., s processing-in-memory (PIM) or computing-in-memory (CIM). For example, the smart storage device 14 may be a CXL device that utilizes a CXL interface. Referring to FIG. 1, the smart storage device 14 may include an accelerator 14a, a storage controller 14b, and the non-volatile memory 14c.

The accelerator 14a may perform the acceleration arithmetic operation according to arithmetic operation commands of the host device 11. For example, the accelerator 14a may be a neural network processing unit, an AI accelerator, a CPU, a GPA (Graphic Processing Unit), a DSP (Digital Signal Processing Unit), an NPU (Neural Processing Unit), an auxiliary processor or other suitable processor. The storage controller 14b may store data in the non-volatile memory 14c or send the data stored in the non-volatile memory 14c to the host device 11 under control of the host device 11.

In some implementations, the host device 11 includes an artificial intelligence model (for example, a generative artificial intelligence model) to be learned (e.g., trained). For example, according to some implementations of the present disclosure, the artificial intelligence model may be distributed from the host device 11 to the accelerator 14a of the smart storage device 14, e.g., rather than being directly trained, or only trained learned, in the host device 11. The non-volatile memory 14c may include learning data used for training the artificial intelligence model. "Learning data," as used herein, refers to training data.

For example, according to some implementations of the present disclosure, the host device 11 initializes the weights and biases used for learning the artificial intelligence model, and shares the initialized weights and biases with the smart storage device 14. The accelerator 14a may learn (e.g., train) the artificial intelligence model by using the learning data stored in the non-volatile memory 14c, on the basis of the weights and biases shared from the host device 11. The accelerator 14a may provide the output value of the artificial intelligence model to the host device 11, and the host device 11 may newly calculate the weights and biases with reference to the output value (e.g., update the weights and biases), and then share the updated values with the accelerator 14a again. The accelerator 14a may learn/train the artificial intelligence model on the basis of the newly calculated weights and biases.

For example, according to some implementations, the artificial intelligence model may be learned/trained in the smart storage device 14 through cache coherency between the host device 11 and the smart storage device 14, and the weights and biases used for the artificial intelligence model (e.g., weights and biases of the model) and the output value(s) of the artificial intelligence model may be shared. For example, the accelerator 14a may refer to the weights and biases calculated from the host device 11 through the CXL.cache protocol, and the host device 11 may refer to the output value of the artificial intelligence model through the CXL.mem protocol.

Figure 2:
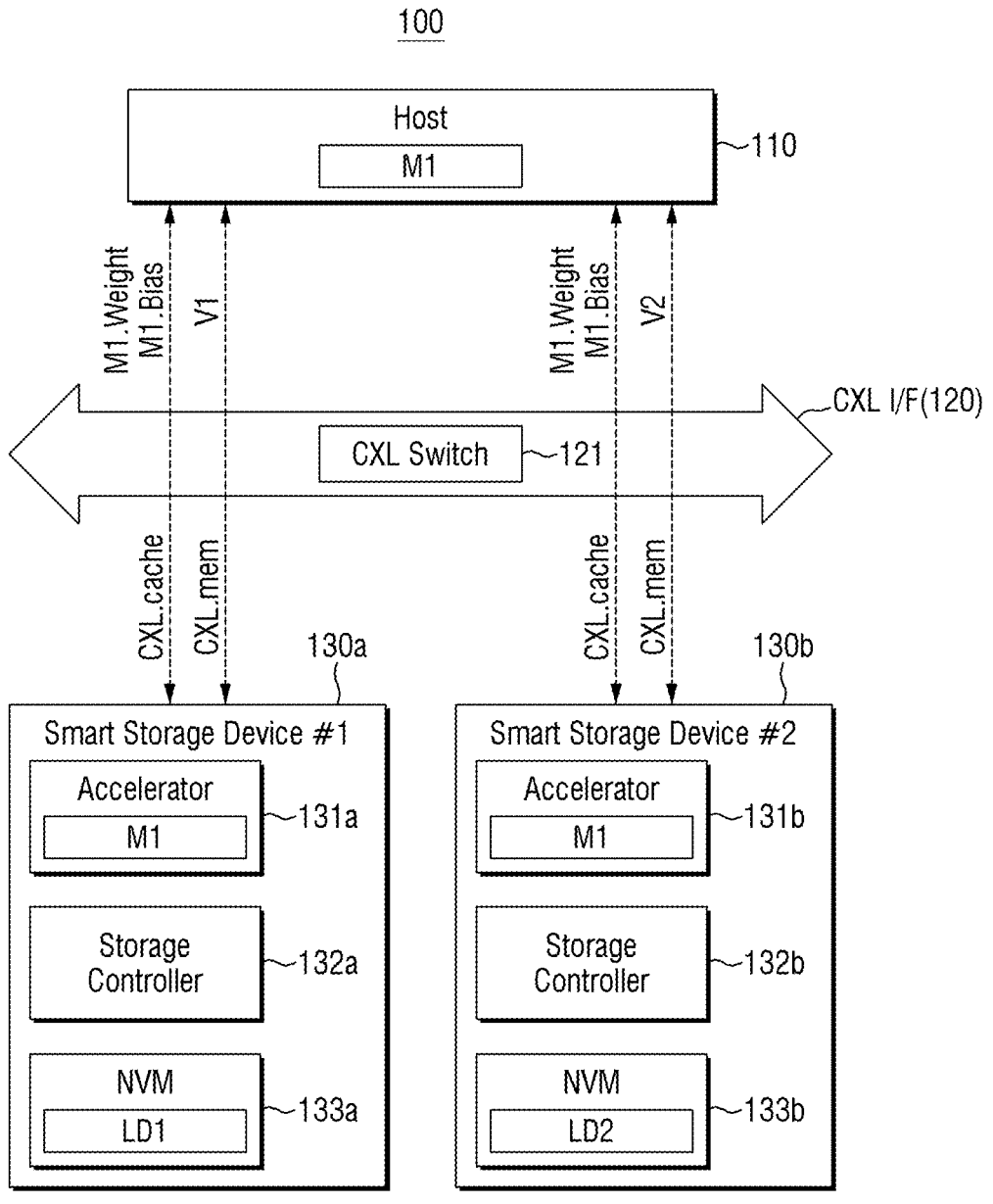
FIG. 2 is a block diagram showing a computing system including a smart storage device to which a CXL interface is applied, according to some implementations of the present disclosure.
Figure 3:
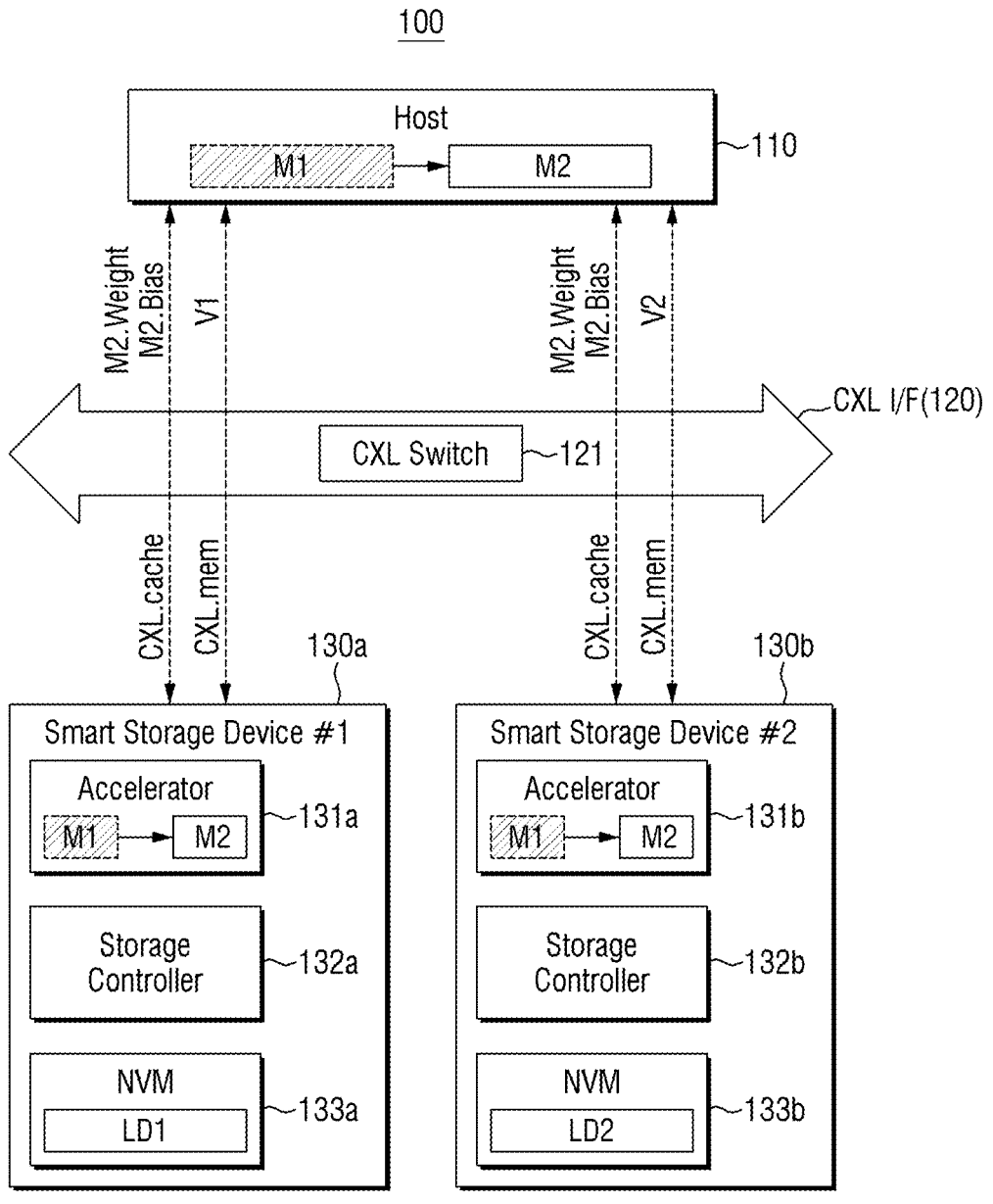
FIG. 3 is a block diagram showing a computing system including a smart storage device to which a CXL interface is applied, according to some implementations of the present disclosure.
Figure 4:
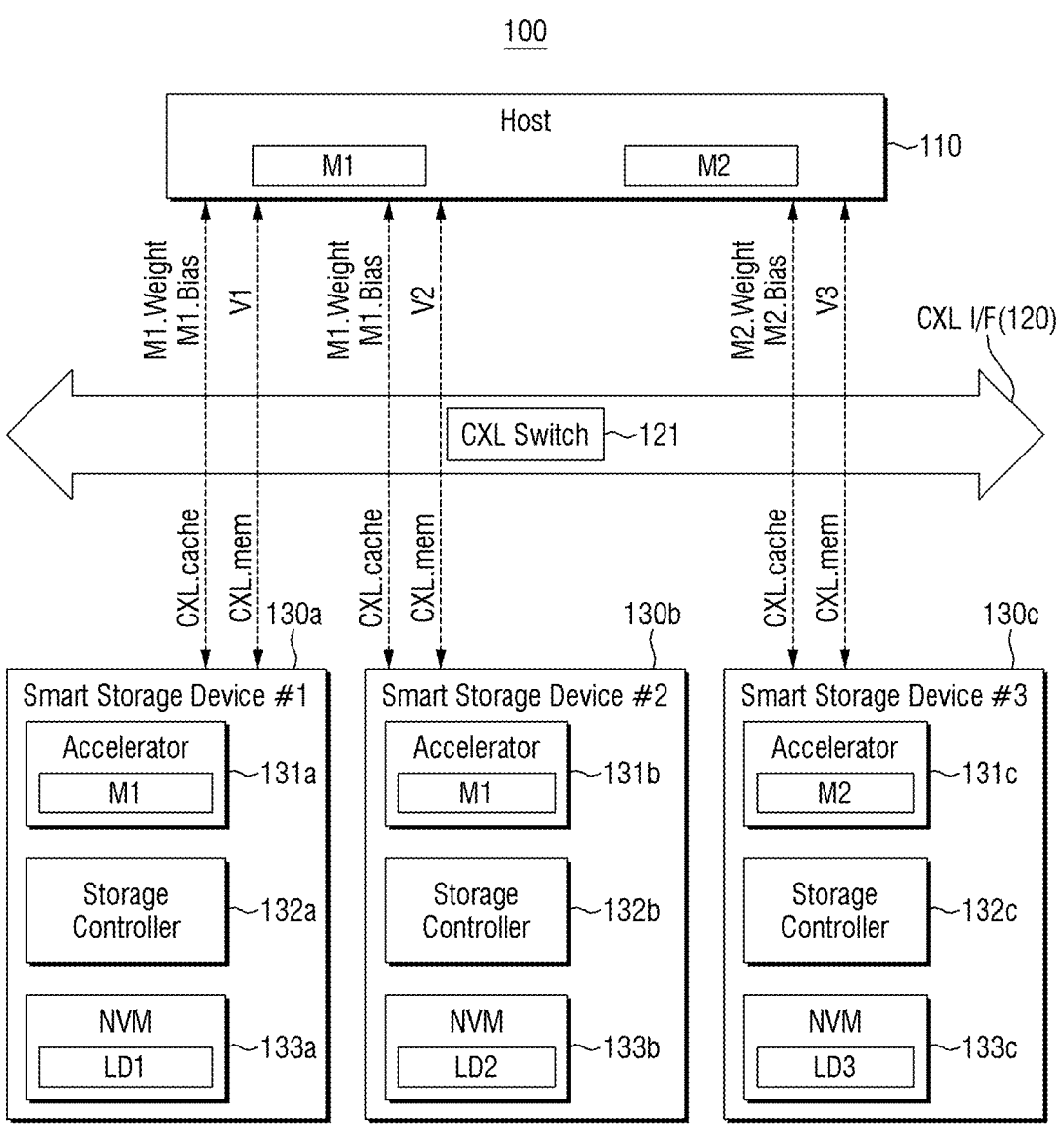
FIG. 4 is a block diagram showing a computing system including a smart storage device to which a CXL interface is applied, according to some implementation of the present disclosure.

Hereinafter, examples in which the artificial intelligence model is learned in the smart storage device will be described in more detail with reference to FIGS. 2 to 4. In FIGS. 2 to 4, the smart interface is assumed to be a CXL interface, but implementations are not limited thereto. Further, among the descriptions of the host device, smart storage device, and components of the smart storage device of FIGS. 2 to 4, repeated descriptions of those described with reference to FIG. 1 will not be provided; these and other elements of FIGS. 2 to 4 can have the characteristics described for the corresponding elements of FIG. 1, except where noted otherwise or suggested otherwise by context.

FIG. 2 is a block diagram showing a computing system 100 including smart storage devices 130a and 130b to which a CXL interface is applied. Referring to FIG. 2, the computing system 100 includes a host device 110, a CXL interface 120, and a plurality of smart storage devices 130a and 130b.

The host device 110 may include a first (artificial intelligence/machine learning) model M1 that is intended to be learned, and may distribute the first model M1 to the accelerators 131a and 131b of the plurality of smart storage devices 130a and 130b. For example, the first model M1 may be a generative artificial intelligence model, but the present disclosure is not limited thereto. The host device 110 may initialize a weight (M1.weight) and a bias (M1.bias) used for learning the first model M1, or may newly calculate the weight and bias by referring to the output value V1 of the first model M1. Detailed description regarding the calculations of the weight and bias will be described in more detail later. Moreover, although descriptions may be provided with respect to a singular weight and a singular bias, it will be understood that multiple weights and multiple biases may be initialized, updated, transferred, etc., as described for the weight and bias.

The CXL interface 120 may include a CXL switch 121. The CXL switch 121 may be configured to mediate communications between the host device 110 and the plurality of smart storage devices 130a and 130b. For example, when the host device 110 and the plurality of smart storage devices 130a and 130b communicate with each other, the CXL switch 121 may be configured to transfer information such as requests, data, responses, and/or signals, which are transferred from the host device 110 or the plurality of smart storage devices 130a and 130b, to the plurality of smart storage devices 130a and 130b or the host device 110.

The plurality of smart storage devices 130a and 130b may each include accelerators 131a and 131b, storage controllers 132a and 132b, and non-volatile memories 133a and 133b. The accelerators 131a and 131b may include (e.g., store, implement, and/or execute) the first model M1 distributed from the host device 110. The storage controllers 132a and 132b may store the learning data LD1 and LD2 in the non-volatile memories 133a and 133b under the control of the host device 110. The accelerators 131a and 131b may refer to the weight (M1.weight) and bias (M1.bias) initialized or calculated/updated in the host device 110 through the CXL.cache protocol (e.g., may receive the weight and bias through the CXL.cache protocol), and the host device 110 may refer to (e.g., receive) the output values V1 and V2 of the first model M1 through the CXL.mem protocol.

For example, the first accelerator 131a and the second accelerator 131b may learn/train the first model M1 by using each of the first learning data LD1 and the second learning data LD2, on the basis of a first weight and a first bias that are set in advance (e.g., initialized in the host device 110). Thereafter, the first accelerator 131a and the second accelerator 131b may provide the host device 110, though the CXL.mem protocol, with a first output value V1 which is output by inputting the first learning data LD1 to the first model M1, and a second output value V2 which is output by inputting the second learning data LD2 to the first model M1.

Next, the host device 110 may newly calculate a second weight and a second bias with reference to the first output value V1 and the second output value V2. For example, the host device 110 may calculate a third weight and a third bias with reference to the first output value V1, and may calculate a fourth weight and a fourth bias with reference to the second output value V2. Further, the host device 110 may calculate an average of the third weight and the fourth weight as the second weight, and may calculate an average of the third bias and the fourth bias as the second bias. However, the present disclosure is not limited thereto, and other types of representative values other than the average (e.g., variance, weighted average, etc.) may be used to calculate the second weight and the second bias.

In this way, after the first weight and the first bias are updated to the second weight and the second bias, the first accelerator 131a and the second accelerator 131b may learn or train the first model M1 by the use of the first learning data LD1 and the second learning data LD2, on the basis of the second weight and the second bias, respectively. The first model M1 may be learned recursively through the above operations.

As described above, the first accelerator 131a and the second accelerator 131b may refer to (e.g., obtain) the first weight, the first bias, the second weight, and the second bias through the CXL.cache protocol. For example, the first model M1 distributed to different smart storage devices 130a and 130b through the CXL.cache protocol may refer to (e.g., incorporate, include, be trained based on, or be otherwise based on) the same weight (M1.weight) and bias (M1.bias).

In some implementations, the first output value V1 and the second output value V2 may include an arithmetic operation accuracy of the first model M1. In some implementations, based on both the arithmetic operation accuracy that is output as a result of learning/training the first model M1 by using the first learning data LD1, and the arithmetic operation accuracy that is output as a result of learning/training the first model M1 by using the second learning data LD2 exceeding a preset threshold, the computing system 100 may complete the learning of the first model M1 described above.

Although the computing system 100 of FIG. 2 is shown to include two smart storage devices 130a and 130b, the present disclosure is not limited thereto, the computing system 100 may include more smart storage devices, and execution of the first model M1 may be performed on more smart storage devices. The weight (M1.weight) and bias (M1.bias) may be synchronized between the smart storage devices through the CXL.cache protocol, and the output values that are output from each smart storage device through the CXL.mem protocol may be provided to the host device 110.

FIG. 3 is a block diagram showing a computing system 100 including smart storage devices 130a and 130b to which a CXL interface is applied. FIG. 3 shows a scenario in which, in the computing system 100 of FIG. 2, the first model M1 is replaced with the second model M2.

When the first model M1 is replaced with the second model M2, the host device 110 may replace and distribute the first model M1 distributed to the accelerators 131a and 131b with the second model M2. The host device 110 may newly initialize a weight (M2.weight) and bias (M2.bias) to use for the second model M2. Hereinafter, since the training of the second model M2 is performed in the same procedure as the learning of the first model M1 described with reference to FIG. 2, repeated explanation will not be provided. In the case of FIG. 3, although the first learning data LD1 and the second learning data LD2 are shown as being retained even if the first model M1 is replaced with the second model M2, the present disclosure is not limited thereto. In some implementations, when the first model M1 is replaced with the second model M2, the first learning data LD1 and the second learning data LD2 may also be changed to other learning data by the storage controllers 132a and 132b.

FIG. 4 is a block diagram showing the computing system 100 including smart storage devices 130a, 130b and 130c to which the CXL interface according is applied. The computing system 100 of FIG. 4 shows a configuration in which a third smart storage device 130c is further included in the computing system 100 of FIG. 2, and the host device 110 further includes a second model M2 intended to be learned at least partially separately from the first model M1. For example, the second model M2 may be a model different from the first model M1.

The host device 110 may distribute the second model M2 to the third accelerator 131c of the third smart storage device 130c, and the non-volatile memory 133c may include a third learning data LD3 that is used for training the second model M2. Further, the host device 110 may initialize the weight (M2.weight) and bias (M2.bias) that are used for learning the second model M2, e.g., separate from the weight (M1.weight) and bias (M1.bias) used for learning the first model M1, and/or may update them based on the output value V3 of the second model M2. Hereinafter, since the training of the second model M2 is performed in the same procedure as the learning of the first model M1 described with reference to FIG. 2, repeated explanation will not be provided.

Figure 5:
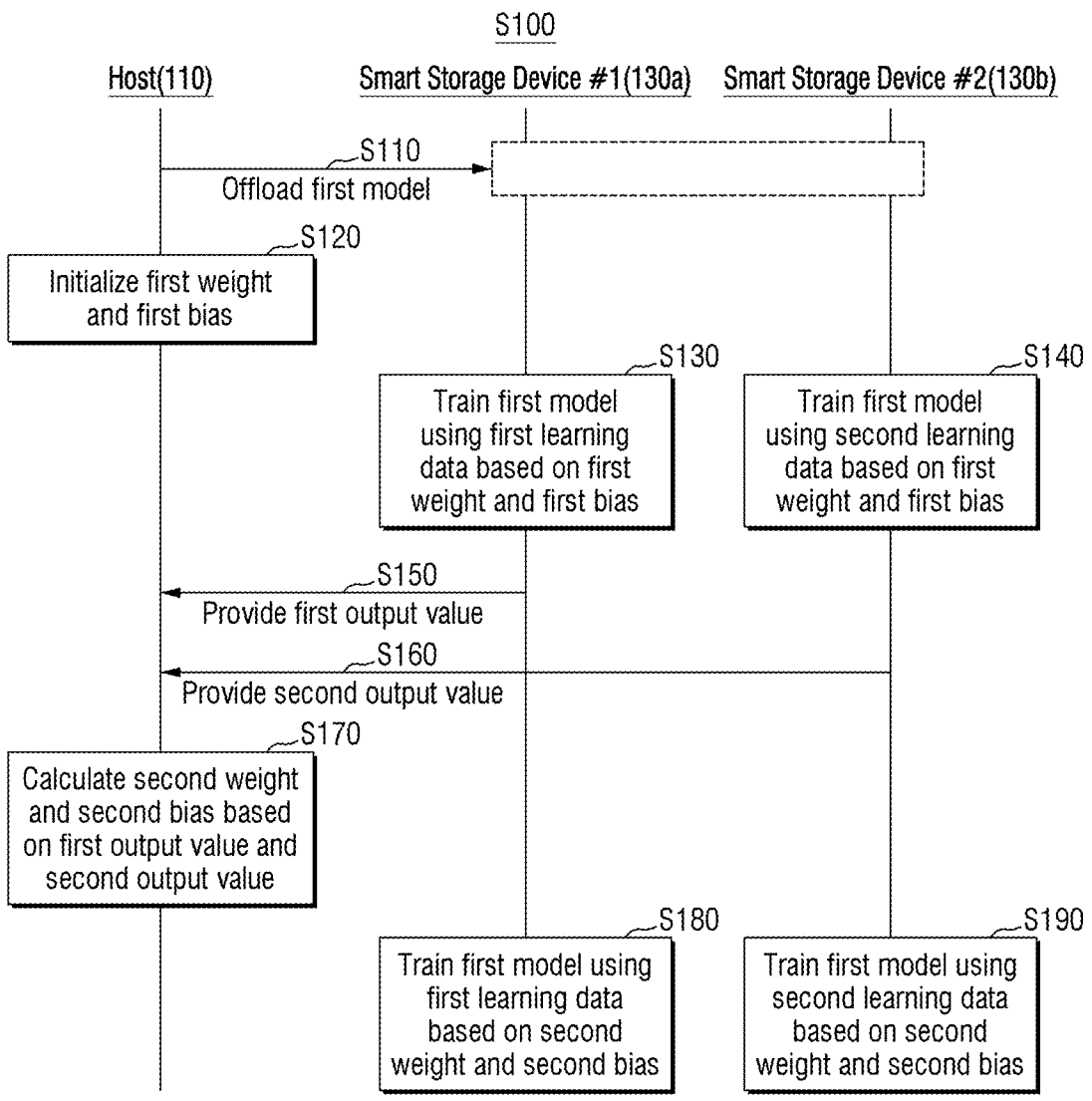
FIG. 5 is a flowchart showing a method for operating a computing system according to some implementations of the present disclosure.

FIG. 5 is a flowchart showing an example of a method (S100) for operation of a computing system according to some implementations of the present disclosure. The method will be described below with reference to FIG. 2 together with FIG. 5.

In step S110, the host device 110 distributes the first model M1 to the first smart storage device 130a and the second smart storage device 130b. For example, the host device 110 may distribute the first model M1 to the first accelerator 131a of the first smart storage device 130a and the second accelerator 131b of the second smart storage device 130b. In step S120, the host device 110 initializes the first weight and the first bias. In step S130, the first smart storage device 130a trains the first model M1 by using the first learning data LD1 on the basis of the first weight and the first bias, and in step S140, the second smart storage device 130b trains the first model M1 by using the second learning data LD2 on the basis of the first weight and the first bias.

In step S150, the first smart storage device 130a provides the host device 110 with a first output value V1 which is output by inputting the first learning data LD1 to the first model M1. In step S160, the second smart storage device 130b provides the host device 110 with a second output value V2 which is output by inputting the second learning data LD2 to the first model M1. In some implementations, the first output value V1 and the second output value V2 may include the arithmetic operation accuracy of the first model M1; other types of values are within the scope of this disclosure, e.g., values indicative of model accuracy. In step S170, the host device 110 newly calculate a second weight and a second bias based on the first output value V1 and the second output value V2.

In step S180, the first smart storage device 130a trains the first model M1 by using the first learning data LD1 on the basis of the second weight and the second bias, and in step S190, the first smart storage device 130a trains the first model M1 by using the second learning data LD2 on the basis of the second weight and the second bias.

Figure 6:
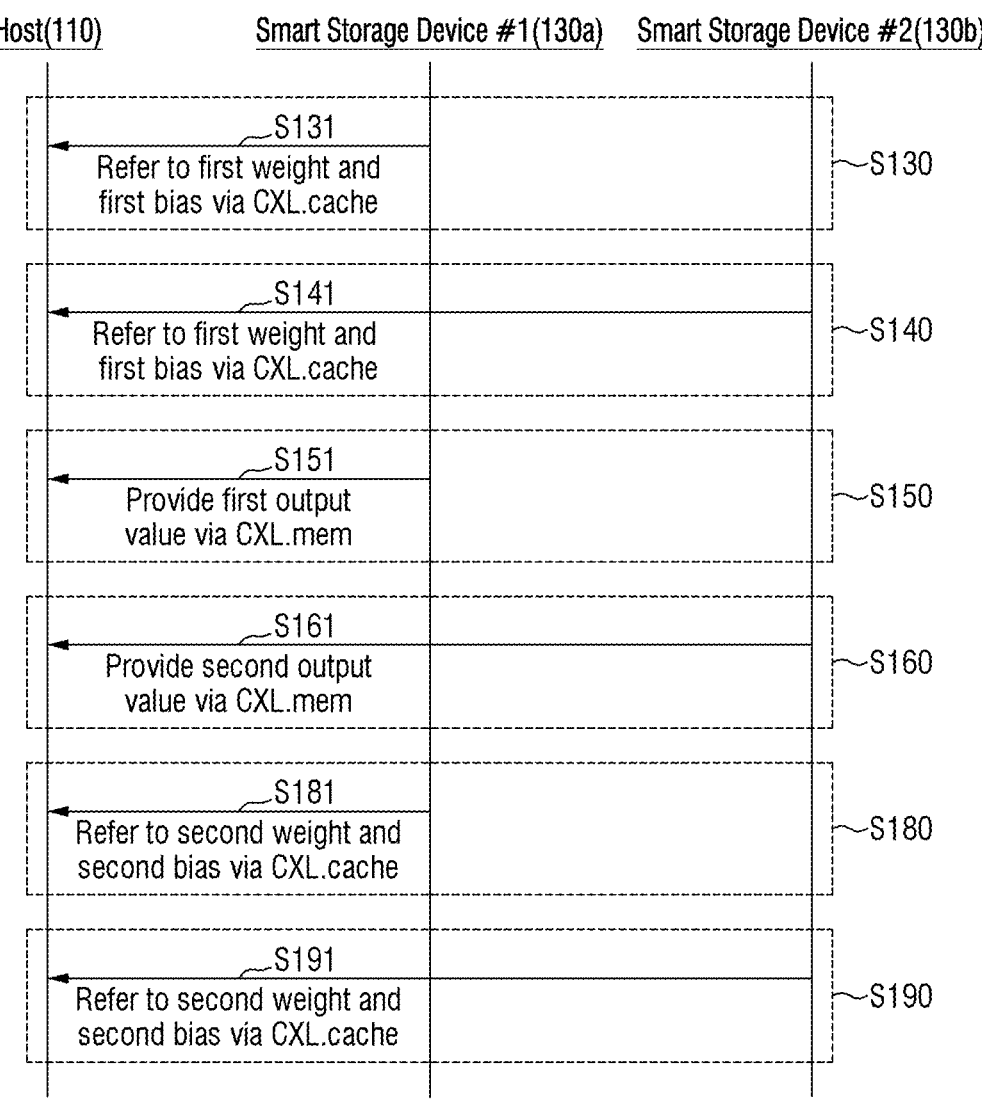
FIG. 6 is a flowchart showing operations of the method of FIG. 5.

FIG. 6 is a flowchart showing operations of training the first model of FIG. 5, e.g., corresponding to the operations of FIG. 5.

Referring to FIG. 6, in step S131, the first smart storage device 130a refers to (e.g., obtains) the first weight and the first bias through the CXL.cache protocol, and in step S141, the second smart storage device 130b refers to (e.g., obtains) the first weight and the first bias through the CXL.cache protocol. In step S151, the first smart storage device 130a provides the first output value V1 to the host device 110 through the CXL.mem protocol, and in step S161, the second smart storage device 130b provides the second output value V2 to the host device 110 through the CXL.mem protocol. In step S181, the first smart storage device 130a refers to (e.g., obtains) the second weight and the second bias through the CXL.cache protocol, and in step S191, the second smart storage device 130b refers to (e.g., obtains) the second weight and the second bias through the CXL.cache protocol.

Figure 7:
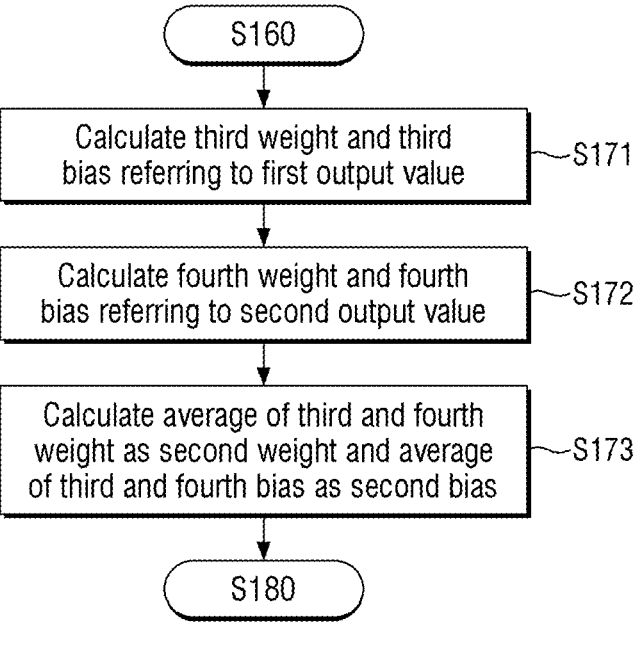
FIG. 7 is a flowchart showing weight calculation operations.

FIG. 7 is a flowchart showing operations associated with calculating the second weight and second bias, e.g., corresponding to operation S170 of newly of FIG. 5. Referring to FIG. 7, in step S171, the host device 110 calculates a third weight and a third bias based on the first output value V1, and in step S172, the host device 110 calculates a fourth weight and a fourth bias based on the second output value V2. Thereafter, in step S173, the host device 110 calculates the average of the third weight and the fourth weight as the second weight, and calculates the average of the third bias and the fourth bias as the second bias.

Figure 8:
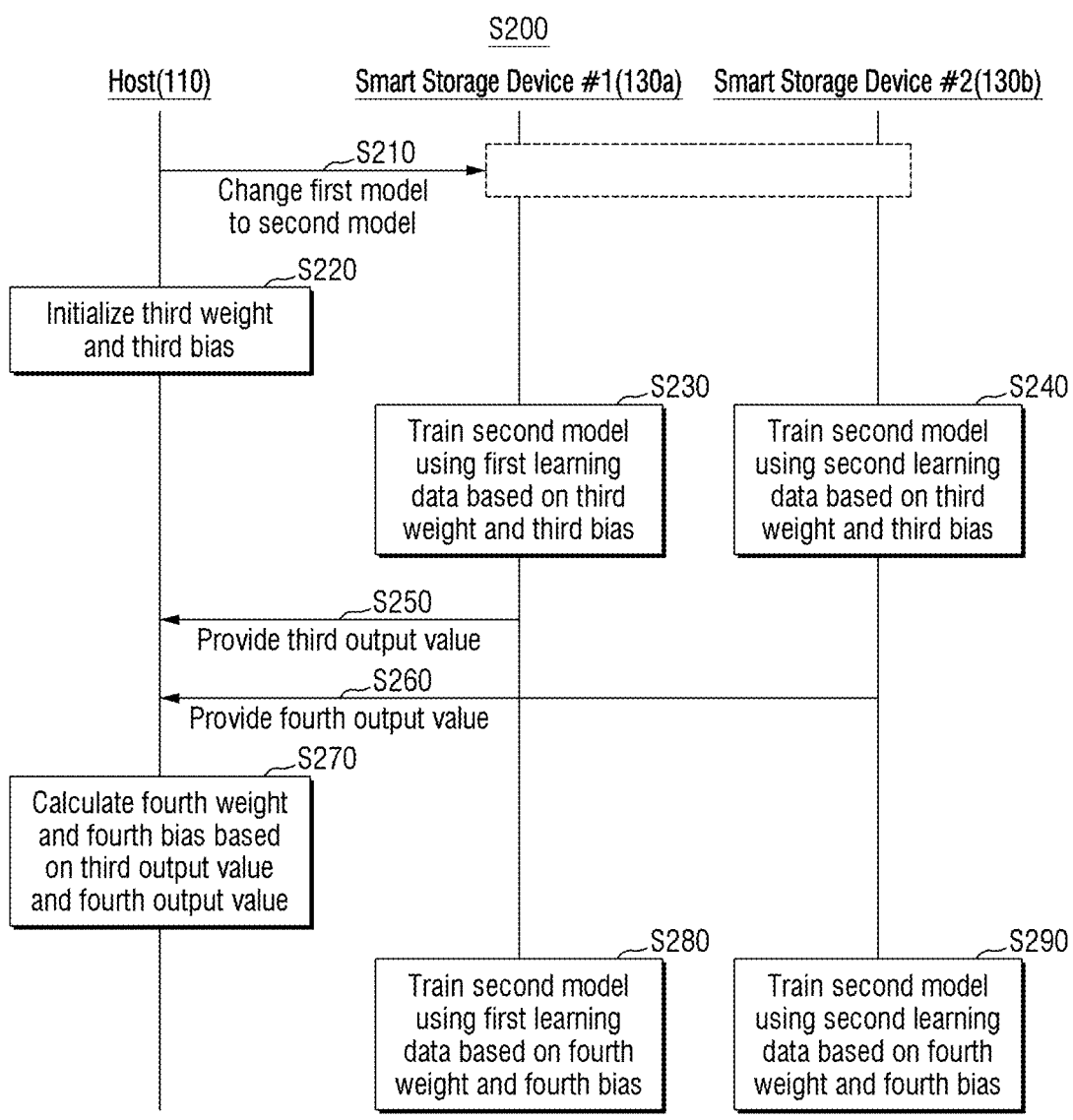
FIG. 8 is a flowchart showing a method for operating a computing system according to some implementations of the present disclosure.

FIG. 8 is a flowchart showing an example of a method (S200) for operation of a computing system according to some implementations of the present disclosure. For example, the operating method (S200) may be performed after the operating method (S100). Explanation of the method (S200) will be given below with reference to FIG. 3 together with FIG. 8.

In step S210, the host device 110 replaces the first model M1 with the second model M2. This may include a step of distributing the second model M2 to the smart storage devices 130a and 130b. In step S220, the host device 110 initializes a third weight and a third bias. In step S230, the first smart storage device 130a trains the second model M2 by using the first learning data LD1 on the basis of the third weight and the third bias, and in step S240, the second smart storage device 130b trains the second model M2 by using the second learning data LD2 on the basis of the third weight and the third bias.

In step S250, the first smart storage device 130a provides the host device 110 with a third output value V3 which is output by inputting the first learning data LD1 to the second model M2, and in step S260, the second smart storage device 130b provides the host device 110 with a fourth output value V4 which is output by inputting the second learning data LD2 to the second model M2. The third output value V3 and the fourth output value V4 may include—but are not limited to—the arithmetic operation accuracy of the second model M2. In step S270, the host device 110 newly calculates a fourth weight and fourth bias by referring to the third output value V3 and the fourth output value V4.

In step S280, the first smart storage device 130a trains the second model M2 by using the first learning data LD1 on the basis of the fourth weight and the fourth bias, and in step S290, the second smart storage device 130b trains the second model M2 by using the second learning data LD2 on the basis of the fourth weight and the fourth bias.

Figure 9:
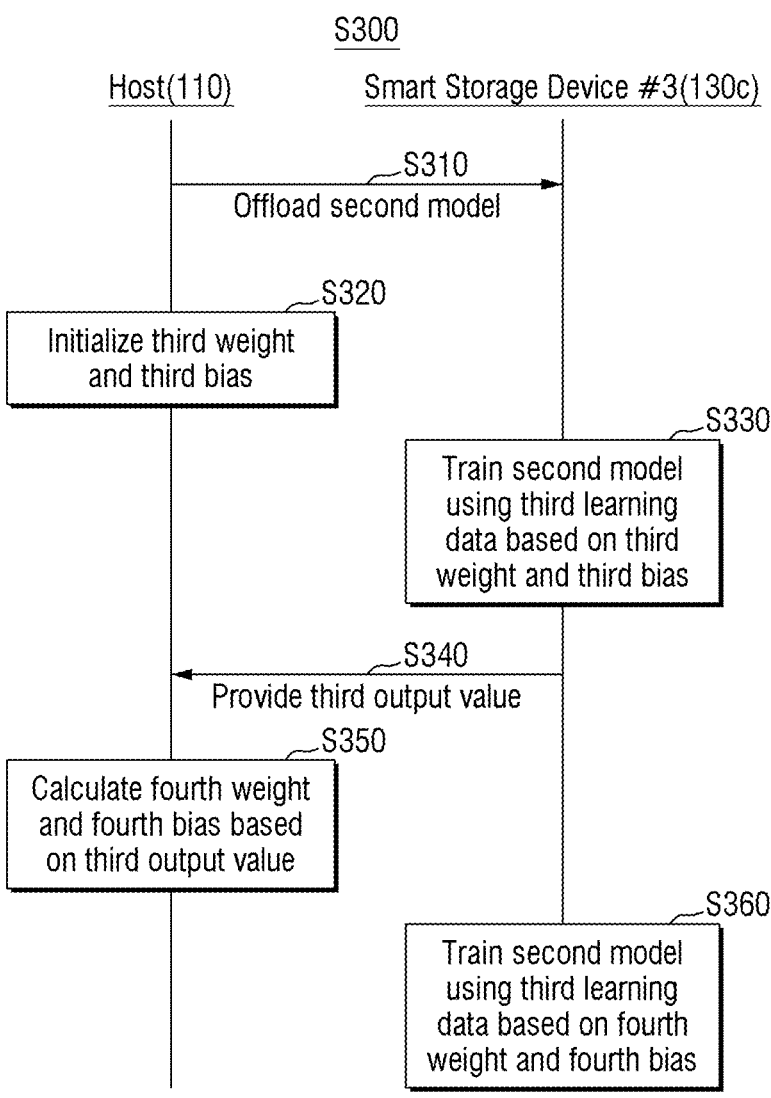
FIG. 9 is a flowchart showing a method for operating a computing system according to some implementations of the present disclosure.

FIG. 9 is a flowchart showing a method (S300) for operation of a computing system according to some implementations of the present disclosure. For example, the operating method (S300) may be performed after operating method (S100) and/or simultaneously with the operating method (S100). Explanation will be given below with reference to FIG. 4 together with FIG. 9.

In step S310, the host device 110 distributes the second model M2 to the third smart storage device 130c. For example, the host device 110 may distribute the second model M2 to the third accelerator 131c of the third smart storage device 130c. In step S320, the host device 110 initializes a third weight and a third bias.

In step S330, the third smart storage device 130c trains the second model M2 by the use of the third learning data LD3 on the basis of the third weight and the third bias. In step S340, the third smart storage device 130c provides the host device 110 with the third output value V3 which is output by inputting the third learning data LD3 to the second model M2. For example, the third output value V3 may include the arithmetic operation accuracy of the second model M2. In step S350, the host device 110 newly calculates a fourth weight and a fourth bias based on the third output value V3, and in step S360, the third smart storage device 130c trains the second model M2 by using the third learning data LD3 on the basis of the fourth weight and the fourth bias.

Figure 10:
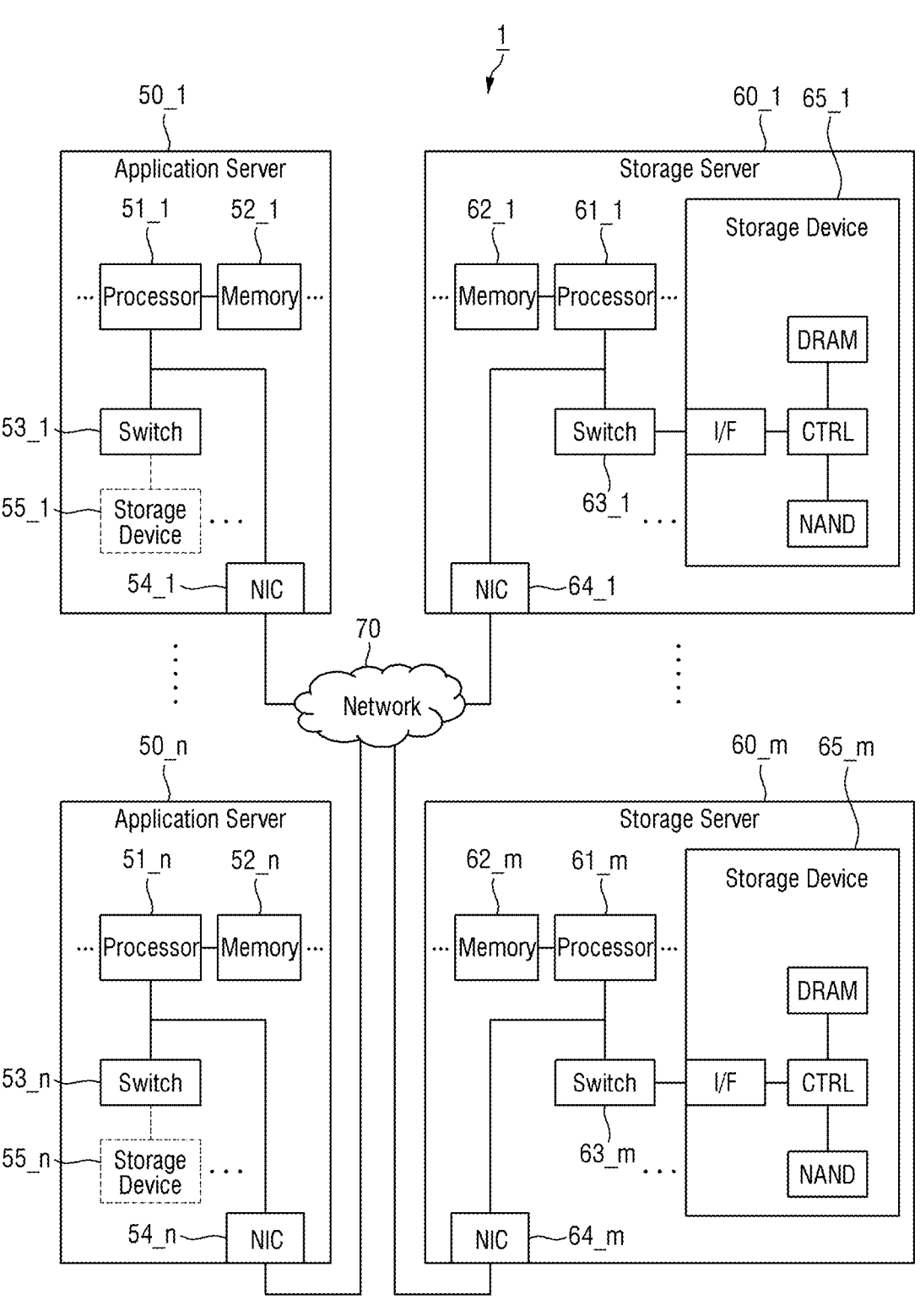
FIG. 10 shows a data center to which a computing system is applied, according to some implementations of the present disclosure.

FIG. 10 is a diagram illustrating a data center in which the foregoing devices and processes can be applied, in some implementations. For example, the computing system 100 described above may be included in the data center 1 as an application server and/or a storage server. Furthermore, in some implementations, the storage devices 130 discussed above may be used as an application server and/or a storage server.

The data center 1 may collect various data and provide service, and may be called a data storage center. For example, the data center 1 may be a system for search engine and database operation, and/or a computing system used by a company such as a bank or a government agency. As shown in FIG. 10, the data center 1 may include application servers 50_1 to 50_n and storage servers 60_1 to 60_m (where m and n are integers greater than 1). The number n of the application servers 50_1 to 50_n and the number m of the storage servers 60_1 to 60_m can vary in different implementations, and the number n of application servers 50_1 to 50_n may be—but need not be—different from the number m of storage servers 60_1 to 60_m.

The application servers 50_1 to 50_n may include at least one of processors 51_1 to 51_n, memories 52_1 to 52_n, switches 53_1 to 53_n, NICs (network interface controllers) 54_1 to 54_n, and storage devices 55_1 to 55_n. The processors 52_1 to 51_n may control the overall operation of the application servers 50_1 to 50_n, and may access the memories 52_1 to 52_n to execute instructions and/or data loaded into the memories 52_1 to 52_n. As a non-restrictive example, the memories 52_1 to 52_n may include a DDR SDRAM (Double Data Rate Synchronous DRAM), a HBM (High Bandwidth Memory), a HMC (Hybrid Memory Cube), a DIMM (Dual In-line Memory Module), an Optane DIMM or a NVMDIMM (Non-Volatile DIMM).

The number of processors and the number of memories included in the application servers 50_1 to 50_n may be variously selected. In some implementations, the processors 51_1 to 51_n and the memories 52_1 to 52_n may be provided in processor-memory pairs. In some implementations, the number of processors 51_1 to 51_n and memories 52_1 to 52_n may be different from each other. The processors 51_1 to 51_n may include a single-core processor or a multi-core processor. In some implementations, the storage devices 55_1 to 55_n may be omitted in the application servers 50_1 to 50_n, as indicated by the dashed lines in FIG. 10. The number of storage devices 55_1 to 55_n included in the storage servers 50_1 to 50_n may be variously selected according to different implementations. The processors 51_1 to 51_n, the memories 52_1 to 52_n, the switches 53_1 to 53_n, the NICs 54_1 to 54_n and/or the storage devices 55_1 to 55_n may communicate with each other through the CXL interface and the CXL switch described above with reference to the drawings.

The storage servers 60_1 to 60_m may include at least one of processors 61_1 to 61_m, memories 62_1 to 62_m, switches 63_1 to 63_m, NICs 64_1 to 64_n, and storage devices 65_1 to 65_m. The processors 61_1 to 61_m and the memories 62_1 to 62_m may operate in a manner similar to the processors 51_1 to 51_n and the memories 52_1 to 52_n of the application servers 50_1 to 50_n described above.

The application servers 50_1 to 50_n and the storage servers 60_1 to 60_m may communicate with each other through a network 70. In some implementations, the network 70 may be implemented using Fiber Channel (FC), Ethernet, or the like. The FC may be a medium used for relatively high-speed data transmission, and an optical switch that provides high performance/high availability may be used. Depending on the access method of the network 70, the storage servers 60_1 to 60_m may be provided as a file storage, a block storage or an object storage.

In some implementations, the network 70 may be a storage-only network such as a SAN (Storage Area Network). For example, the SAN may utilize an FC network, and may be a FC-SAN implemented according to FCP (FC protocol). Alternatively, the SAN may be an IP-SAN that uses TCP/IP network and is implemented according to an iSCSI (SCSI over TCP/IP or Internet SCSI) protocol. In some implementations, the network 70 may be a general network such as a TCP/IP network. For example, the network 70 may be implemented according to protocols such as an FCOE (FC over Ethernet), a NAS (Network Attached Storage), and a NVMe-oF (NVMe over Fabrics).

Hereinafter, although the application server 50_1 and the storage server 60_1 will be mainly described, it is noted that the description of the application server 50_1 is also applicable to other application servers (e.g., 50_n), and the description of the storage server 60_1 is also applicable to other storage servers (e.g., 60_m).

The application server 50_1 may store data requested by a user or a client to store in one of the storage servers 60_1 to 60_m through the network 70. In addition, the application server 50_1 may obtain data requested by the user or client to read from one of the storage servers 60_1 to 60_m through the network 70. For example, the application server 50_1 may be implemented by a Web server, a DBMS (Database Management System), and/or the like.

The application server 50_1 may access the memory 52_n and/or the storage device 55_n included in other application servers 50_n through the network 70, and/or may access the memories 62_1 to 62_m and/or the storage devices 65_1 to 65_m included in the storage servers 60_1 to 60_m through the network 70. Accordingly, the application server 50_1 can perform various operations on data stored in the application servers 50_1 to 50_n and/or the storage servers 60_1 to 60_m. For example, the application server 50_1 may execute instructions for moving or copying the data between the application servers 50_1 to 50_n and/or the storage servers 60_1 to 60_m. The data may be moved from the storage devices 65_1 to 65_m of the storage servers 60_1 to 60_m to the memories 52_1 to 52_n of the application servers 50_1 to 50_n, through the memories 62_1 to 62_m of the storage servers 60_1 to 60_m or directly. In some implementations, data moving through the network 70 may be data encrypted for security or privacy.

In the storage server 60_1, the interface IF may provide a physical connection between the processor 61_1 and the controller CTRL, and a physical connection between the NIC 64_1 and the controller CTRL. For example, the interface IF may be implemented as a DAS (Direct Attached Storage) type that directly connects the storage device 65_1 with a dedicated cable. The interface IF may be implemented in various interface types, such as an ATA (Advanced Technology Attachment), a SATA (Serial ATA), an e-SATA (External SATA), a SCSI (Small Computer Small Interface), a SAS (Serial Attached SCSI), a PCI (Peripheral Component Interconnection), a PCIe (PCI express), a NVMe (NVM express), an IEEE 1394, a USB (universal serial bus), a SD (secure digital) card, an MMC (multimedia card), an eMMC (embedded multi-media card), a UFS (Universal Flash Storage), an eUFS (embedded Universal Flash Storage), and/or a CF (compact flash) card interface.

In the storage server 60_1, the switch 63_1 may selectively connect the processor 61_1 and the storage device 65_1 or selectively connect the NIC 64_1 and the storage device 65_1 under the control of the processor 61_1.

In some implementations, the NIC 64_1 may include a network interface card, a network adapter, or the like. The NIC 54_1 may be connected to the network 70 by a wired interface, a wireless interface, a Bluetooth interface, an optical interface, or the like. The NIC 54_1 may include an internal memory, a DSP, a host bus interface, and the like, and may be connected to the processor 61_1 and/or the switch 63_1 and the like through the host bus interface. In some implementations, the NIC 64_1 may be integrated with at least one of the processor 61_1, the switch 63_1, and the storage device 65_1.

In the application servers 50_1 to 50_n or the storage servers 60_1 to 60_m, the processors 51_1 to 51_m and 61_1 to 61_n may transmit commands to the storage devices 55_1 to 55_n and 65_1 to 65_m or the memories 52_1 to 52_n and 62_1 to 62_m to program or read the data. At this time, the data may be error-corrected data through an error correction code (ECC) engine. The data may be data subjected to a data bus conversion (DBI) or data masking (DM) process, and may include a CRC (Cyclic Redundancy Code) information. The data may be data encrypted for security or privacy.

The storage devices 55_1 to 55_n and 65_1 to 65_m may transmit the control signal and command/address signal to the non-volatile memory device (e.g., NAND flash memory device) NVM, in response to the read commands received from the processors 51_1 to 51_m and 61_1 to 61_n. Therefore, when reading the data from the non-volatile memory device NVM, the read enable signal is input to the data output control signal, and may serve to output data to the DQ bus. A data strobe signal may be generated, using the read enable signal. Command and address signal may be latched according to a rising edge or a falling edge of the write enable signal.

The controller CTRL may generally control the operation of the storage device 65_1. In some implementations, the controller CTRL may include a static random access memory (SRAM). The controller CTRL may write data on the non-volatile memory device NVM in response to the write command, or may read data from the non-volatile memory device NVM in response to the read command. For example, the write command and/or the read command may be generated on the basis of the request provided from a host, for example, the processor 61_1 in the storage server 60_1, the processor 61_m in another storage server 60_m, or the processors 51_1 to 51_n in the application servers 50_1 to 50_n. The buffer BUF may temporarily store (buffer) data to be written to the non-volatile memory device NVM or data read from the non-volatile memory device NVM. In some implementations, the buffer BUF may include a DRAM. Furthermore, the buffer BUF may store metadata, and the metadata may refer to a user data or data generated by the controller CTRL to manage the non-volatile memory device NVM. The storage device 65_1 may include a SE (Secure Element) for security or privacy.

In some implementations, any or all of the storage devices 55_1 to 55_n and/or 65_1 to 65_m, and/or any or all of the memories 51_1 to 52_n and/or 62_1 to 62_m, are smart storage devices (e.g., a smart storage device 130 as described with respect to FIGS. 1 to 9). Moreover, in some implementations, any or all of the processors 51_1 to 51_n and/or 61_1 to 61_m can be configured as a host 110 as described with respect to FIGS. 1-9. Accordingly, in some implementations, the data center 1 can perform model training as described with respect to FIGS. 1-9.

According to some implementations of the present disclosure, by distributing a generative artificial intelligence model that requires a large amount of learning data to the smart storage device having the accelerator, an artificial intelligence model may be learned by using learning data held by each smart storage device. Through the cache coherency between each smart storage device and the host device, the weights and biases required for learning the artificial intelligence model may be synchronized between the smart storage devices in real time. Furthermore, in some implementations, since the repeated movement of learning data does not occur, input/output traffic may be significantly reduced.

Various examples and effects have been described with reference to FIGS. 1 to 10. However, the effects of the technical ideas in the present disclosure are not restricted to those set forth explicitly above, and other unmentioned technical effects will be clearly understood by those of ordinary skill in the art.

While this disclosure contains many specific implementation details, these should not be construed as limitations on the scope of what may be claimed. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

Although operations are shown in a specific order in the drawings, it should not be understood that desired results can be obtained when the operations must be performed in the specific order or sequential order or when all of the operations must be performed. In certain situations, multitasking and parallel processing may be advantageous. Moreover, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the above-described examples without departing from scope of the present disclosure. The scope of protection of this disclosure should be interpreted in accordance with the claims below.

What is claimed is:

1. A smart storage device comprising:
an accelerator connected to a host device through a smart interface, wherein the accelerator stores a first model received from the host device; and
a non-volatile memory storing training data used for training the first model,
wherein the accelerator is configured to:
train the first model using the training data based on a first weight and a first bias,
provide the host device with a first output value, wherein the first output value is based on inputting the training data into the first model,
receive, from the host device, a second weight and a second bias, wherein the second weight and the second bias are calculated by the host device based on the first output value, and
train the first model using the training data based on the second weight and the second bias.

2. The smart storage device of claim 1,
wherein the smart interface is a Compute eXpress Link (CXL) interface, and the smart storage device is a CXL device.

3. The smart storage device of claim 2,
wherein the accelerator and the smart interface are connected using a CXL.cache protocol and a CXL.mem protocol, and
wherein the accelerator is configured to receive the first weight, the second weight, the first bias, and the second bias through the CXL.cache protocol, and to provide the first output value to the host device through the CXL.mem protocol.

4. The smart storage device of claim 1, wherein the accelerator is configured to:
receive a second model from the host device;
train the second model using the training data based on a third weight and a third bias;
provide the host device with a second output value, wherein the second output value is based on inputting the training data into the second model;
receive, from the host device, a fourth weight and a fourth bias, wherein the fourth weight and the fourth bias are calculated by the host device based on the second output value; and
train the second model using the training data based on the fourth weight and the fourth bias.

5. The smart storage device of claim 1,
wherein the first model is a generative model, and wherein the first output value includes an arithmetic operation accuracy of the first model.

6. A computing system comprising:
a smart interface connected to a host device;
a first smart storage device including a first accelerator and a first non-volatile memory; and
a second smart storage device including a second accelerator and a second non-volatile memory,
wherein the first accelerator and the second accelerator are each connected to the smart interface and each store a first model received from the host device,
wherein the first non-volatile memory and the second non-volatile memory respectively store first training data and second training data used for training the first model, and
wherein the first accelerator and the second accelerator are configured to:
train the first model using the first training data and the second training data, respectively, based on a first weight and a first bias,
respectively provide the host device with a first output value, wherein the first output value is based on inputting the first training data into the first model, and a second output value, wherein the second output value is based on inputting the second training data into the first model, and
train the first model using the first training data and the second training data, respectively, based on a second weight and a second bias calculated by the host device based on the first output value and the second output value and received at the first smart storage device and the second smart storage device from the host device.

7. The computing system of claim 6,
wherein the smart interface is a Compute eXpress Link (CXL) interface, and the first smart storage device and the second smart storage device are CXL devices.

8. The computing system of claim 7, wherein the first accelerator and the second accelerator are connected to the smart interface are connected using a CXL.cache protocol and CXL.mem protocol, and wherein the first accelerator and the second accelerator are configured to:

receive the first weight, the second weight, the first bias, and the second bias from the host device through the CXL.cache protocol, and provide the first output value and the second output value, respectively, to the host device through the CXL.mem protocol.

9. The computing system of claim 6, wherein the second weight is an average of a third weight calculated based on the first output value and a fourth weight calculated based on the second output value, and wherein the second bias is an average of a third bias calculated based on the first output value and a fourth bias calculated based on the second output value.

10. The computing system of claim 6, wherein the first model is a generative model, and wherein the first output value and the second output value include an arithmetic operation accuracy of the first model.

11. The computing system of claim 6, wherein the first accelerator and the second accelerator are configured to:

receive a second model from the host device, train the second model using the first training data and the second training data, respectively, based on a third weight and a third bias, respectively provide the host device with a third output value, wherein the third output value is based on inputting the first training data into the second model, and a fourth output value, wherein the fourth output value is based on inputting the second training data into the second model, and train the second model using the first training data and the second training data, respectively, based on a fourth weight and a fourth bias newly calculated by the host device based on the third output value and the fourth output value and received at the first storage device and the second smart storage device from the host device.

12. The computing system of claim 6, wherein the computing system includes a third smart storage device including a third accelerator and a third non-volatile memory, wherein the third accelerator is connected to the smart interface and stores a second model received from the host device, wherein the third non-volatile memory stores third training data used for training the second model, and wherein the third accelerator is configured to:

train the second model using third training data based on a third weight and a third bias, provides the host device with a third output value, wherein the third output value is based on inputting the third training data into the second model, and train the second model using the third training data based on a fourth weight and a fourth bias calculated by the host device based on the third output value and received at the third smart storage device from the host device.

13. A method of operation of a computing system, wherein the computing system comprises a host device, a smart interface, and a first smart storage device and a second smart storage device connected to the host device through the smart interface, the method comprising:

distributing a first model from the host device to the first smart storage device and the second smart storage device;

initializing a first weight and a first bias at the host device;

training the first model using first training data based on the first weight and the first bias at the first smart storage device;

training the first model using the second training data based on the first weight and the first bias at the second smart storage device;

providing the host device with a first output value, wherein the first output value is based on inputting the first training data into the first model at the first smart storage device;

providing the host device with a second output value, wherein the second output value is based on inputting the second training data into the first model at the second smart storage device;

calculating, at the host device, a second weight and a second bias based on the first output value and the second output value;

training the first model using the first training data based on the second weight and the second bias at the first smart storage device; and training the first model using the second training data based on the second weight and the second bias at the second smart storage device.

14. The method of claim 13, wherein the first smart storage device and the second smart storage device include a first accelerator and a second accelerator, respectively, and wherein distributing the first model to the first smart storage device and the second smart storage device comprises distributing the first model to the first accelerator and the second accelerator.

15. The method of claim 13, wherein the smart interface is a Compute eXpress Link (CXL) interface, and the first smart storage device and the second smart storage device are CXL devices.

16. The method of claim 15, wherein the first smart storage device and the second smart storage device are connected to the smart interface using a CXL.cache protocol and CXL.mem protocol, wherein training the first model using the first training data based on the first weight and the first bias comprises receiving the first weight and the first bias at the first smart storage device through the CXL.cache protocol, wherein training the first model using the second training data based on the first weight and the first bias comprises receiving the first weight and the first bias at the second smart storage device through the CXL.cache protocol, wherein training the first model using the first training data based on the second weight and the second bias comprises receiving the second weight and the second bias at the first smart storage device through the CXL-.cache protocol, wherein training the first model using the second training data based on the second weight and the second bias comprises receiving the second weight and the second bias at the second smart storage device through the CXL.cache protocol, wherein providing the first output value to the host device comprises providing the first output value from the first smart storage device to the host device through the CXL.mem protocol, and wherein providing the second output value to the host device includes providing the second output value from the second smart storage device to the host device through the CXL.mem protocol.

17. The method of claim 13, wherein calculating the second weight and the second bias comprises:

calculating a third weight and a third bias based on the first output value;

calculating a fourth weight and a fourth bias based on the second output value; and calculating an average of the third weight and the fourth weight as the second weight, and calculating an average of the third bias and the fourth bias as the second bias.

18. The method of claim 13, wherein the first model is a generative model, and the first output value and the second output value include an arithmetic operation accuracy of the first model.

19. The method of claim 13, further comprising:

replacing the first model with a second model at the host device;

initializing a third weight and a third bias at the host device;

training the second model using the first training data based on the third weight and the third bias at the first smart storage device;

training the second model using the second training data based on the third weight and the third bias at the second smart storage device;

providing the host device with a third output value, wherein the third output value is based on inputting the first training data into the second model at the first smart storage device;

providing the host device with a fourth output value, wherein the fourth output value is based on inputting the second training data into the second model at the second smart storage device;

calculating, at the host device, a fourth weight and a fourth bias based on the third output value and the fourth output value;

training the second model using the first training data based on the fourth weight and the fourth bias at the first smart storage device; and training the second model using the second training data based on the fourth weight and the fourth bias at the second smart storage device.

20. The method of claim 13, wherein the computing system includes a third smart storage device connected to the host device through the smart interface, the third smart storage device storing third training data, and wherein the method further comprises:

distributing a second model from the host device to the third smart storage device;

initializing a third weight and a third bias at the host device;

training the second model using the third training data based on the third weight and the third bias at the third smart storage device;

providing the host device with a third output value, wherein the third output value is based on inputting the third training data into the second model at the third smart storage device;

calculating, at the host device, a fourth weight and a fourth bias based on the third output value; and training the second model using the third training data based on the fourth weight and the fourth bias at the third smart storage device.

* * * * *